Dec. 13, 1938.    W. G. JOHNSON    2,140,403
CASTER
Filed Feb. 13, 1937

INVENTOR.
WILFRED G. JOHNSON
BY
ATTORNEYS

Patented Dec. 13, 1938

2,140,403

UNITED STATES PATENT OFFICE 2,140,403

CASTER

Wilfred G. Johnson, Elyria, Ohio, assignor to The Colson Corporation, Elyria, Ohio, a corporation of Ohio Application February 13, 1937, Serial No. 125,571

8 Claims. (Cl. 16—21)

This invention relates to casters and methods of making the same, and more particularly to an improved type of ball bearing caster.

It is among the objects of the invention to provide a compact, sturdy and durable ball bearing caster which will swivel freely and easily, and which can be economically manufactured. Another object of my invention is to provide an efficient and economical method of manufacturing or assembling such casters. Another object is to provide a caster and method of making the same whereby the caster can be economically assembled from inexpensive parts. A further object of my invention is to provide a caster having a low over-all height as compared to prior types of ball bearing casters. Another object is to provide a caster of simple construction having a neat and smooth external appearance.

Other objects and advantages of my invention will become apparent from the following description of a preferred form thereof, reference being made to the accompanying drawing. The essential characteristics are summarized in the claims.

Figure 1:
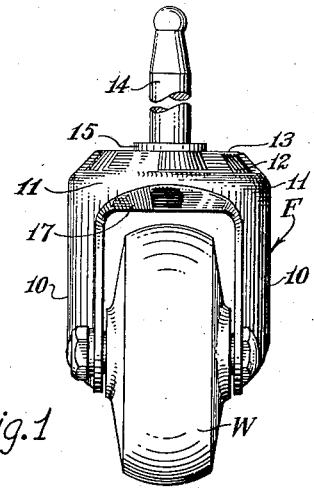
Figure 2:
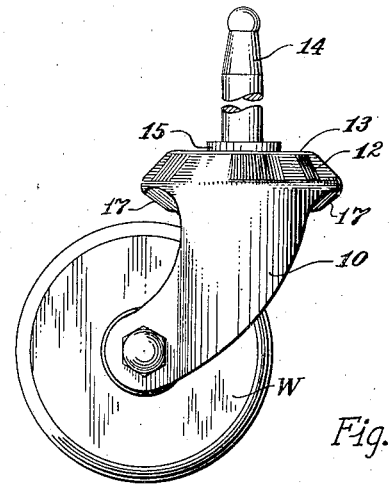
Figure 3:
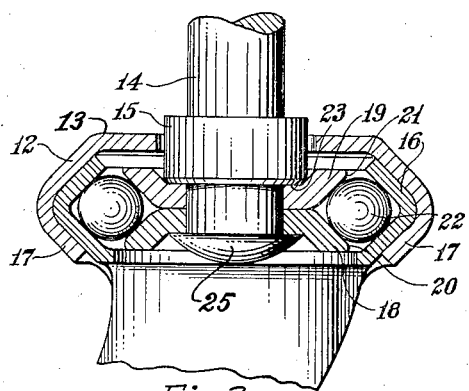
Figure 5:
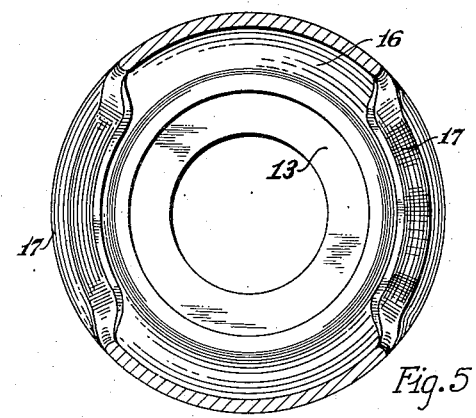
Figure 6:
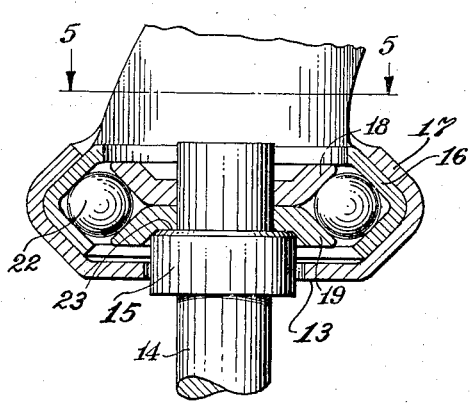
Figure 4:
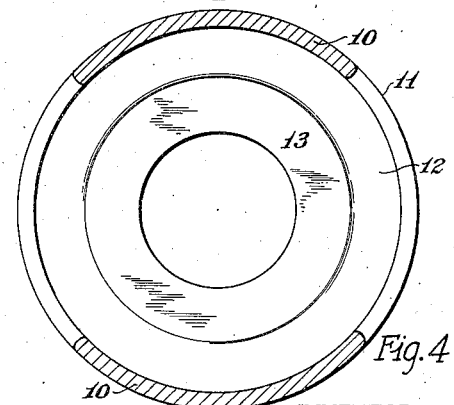

In the drawing, Figure 1 is a front elevation of a preferred form of my caster; Figure 2 is a side elevation thereof; Figure 3 is a vertical section on an enlarged scale through the swivel bearing of the caster illustrated in Figures 1 and 2; Figure 4 is a view of the bottom of the caster fork member, the legs being broken away for convenience in illustration; Figure 5 is a view similar to Figure 4 and in addition illustrates the outer ball race secured in position in the fork member; and Figure 6 is a vertical section showing a further step in the assembly of the swivel bearing.

As shown in the drawing, a preferred form of my caster may comprise a fork member indicated generally at F and having downwardly extending legs 10 which suitably support the wheel W. The upper portion of the fork member has a generally cylindrical portion indicated at 11, an inwardly tapering conical portion 12 and a centrally perforated flat top surface 13. The swivel bearing mechanism, to be later described, is disposed within the upper fork member and functions to support the stem 14 which may be inserted within a socket in the leg of a chair, for example, in the usual manner. The stem is provided with an enlarged portion 15, having an upper surface disposed slightly above the surface 13 of the fork member and adapted to engage the end of the leg of the chair or other article to be supported.

As noted above, the swivel bearing mechanism is disposed within the upper end portion of the fork member F. As illustrated particularly in Figure 3, the bearing mechanism preferably includes an outer ball race 16 which may comprise an annular member having intersecting substantially conical walls, the upper wall conforming to the conical portion 12 of the fork member F and the lower wall extending downwardly and inwardly substantially at right angles thereto. The outer ball race may conveniently be held in position within the fork member by crimping over or bending inwardly oppositely disposed portions 17 of the generally cylindrical portion 11 of the fork member until the walls of the fork member in these regions firmly engage and retain the ball race.

The inner ball race may preferably be formed of two oppositely disposed flanged members 18 and 19 having diverging conical faces 20 and 21, respectively, which engage the balls 22 disposed between the outer and inner ball races. These flanged members support the stem 14 and are secured together thereby. As shown in Figure 3, the lower surface 23 of the enlarged portion 15 of the stem engages the upper surface of the flanged member 19. The stem projects through the two flanged members, and at its lower end may be riveted over as at 25 into engagement with the lower surface of the member 18 or otherwise arranged to secure the stem within the bearing and firmly hold the two flanged bearing members together. By this construction, it will be seen that I have provided a simple and effective bearing which will efficiently resist thrusts in all directions.

Casters made according to my invention may be manufactured economically because of the simplicity of the component parts and the ease of assembly. Various stages in a preferred method of assembling the casters are illustrated in Figures 4, 5 and 6. Referring particularly to Figure 4, it will be noted that the fork member F may conveniently comprise an integral stamping having the cylindrical portion 11 formed as a flange projecting from the conical portion 12 and the flat perforated surface 13. The legs 10 are continuations of the cylindrical flange 11 and preferably are curved in cross section, as shown, throughout the greater portion of their length in order to insure adequate strength and stiffness in the legs without requiring metals of excessive thickness.

In assembling the bearing mechanism of the caster, it is only necessary to insert the outer ball race 16 within the cylindrical portion 11 of the caster as shown in Figure 5, and thereafter bend or crimp the cylindrical walls inwardly in a region between the legs 10 as shown at 17. This operation can be carried out rapidly and economically and insures a strong and permanent connection between the fork member F and the outer ball race 16.

Preferably the crimping operation is carried out as described, before any of the other bearing assembly operations. Thereafter, the bearing may be conveniently assembled by supporting the fork and outer ball race in an inverted position as shown in Figure 6, dropping the upper flanged member 19 over the end of the stem 14 and into engagement with the surface 23 of the enlarged portion 15, inserting the balls 22 in position between the opposed conical surfaces of the outer ball race and the flanged member 19, and thereafter dropping the flanged member 18 over the end of the stem 14 and finally riveting the end of the stem to secure the parts together. Obviously, the stem and members 18 and 19 may be secured together by means other than riveting. For example, the end of the stem might be threaded and secured by a nut and lock washer. Thereafter the wheel W may be assembled in the fork member in the usual manner, thus completing the caster except for such finishing operations as may be desired.

It will be evident that all of the parts of my caster can be produced and assembled rapidly and economically because of their simple construction and because of my simple method of mounting the swivel bearing within the fork member. The caster presents a neat and smooth appearance and may be made with a low overall height because of the fact that the entire bearing mechanism is disposed within the fork member. As the fork member is carried over the top of the bearing, the flat portion 13 thereof prevents dirt and dust from reaching the bearing and the smooth round exterior of the fork member prevents threads from becoming entangled in the bearing mechanism and around the stem. These features insure durability, freedom from trouble, and continued ease of operation of casters embodying my invention.

It will be evident to those skilled in the art that various changes and modifications can be made in my invention, as to both the construction of the caster and the method of assembly, without departing from the spirit and scope thereof. It is therefore to be understood that my patent is not limited to the preferred form of my invention described herein or in any manner other than by the appended claims when given the range of equivalents to which my patent may be entitled.

I claim:

1. A caster comprising an integrally formed fork member having a perforated flat upper portion, a downwardly extending outwardly flared conical portion, a cylindrical flange depending therefrom, and oppositely disposed legs extending downwardly from said cylindrical flange, a wheel supported by said legs, a swivel bearing disposed within said fork member and comprising an outer ball race, an inner ball race and bearing balls therebetween, portions of said cylindrical flange being deformed inwardly into engagement with said outer ball race to retain said swivel bearing in position, and means extending through the perforation in the upper portion of said fork member and engaging said inner ball race for mounting the caster on an article to be supported.

2. A caster comprising an integrally formed fork member having a perforated flat upper portion, a downwardly extending outwardly flared conical portion, a cylindrical flange portion depending therefrom and oppositely disposed leg portions extending downwardly from said cylindrical flange, a wheel supported by said leg portion, a swivel bearing disposed within said fork member and comprising an outer ball race, an inner ball race comprising two oppositely extending flanged members and bearing balls between said inner and outer ball races, portions of said cylindrical flange being deformed inwardly into engagement with said outer ball race to retain said swivel bearing in position, and means extending through the perforation in the upper portion of said fork member for securing said flanged members together and for mounting the caster on an article to be supported.

3. A caster comprising a fork member having a perforated upper portion, a downwardly extending outwardly flared conical portion, a cylindrical flange depending therefrom and oppositely disposed legs extending downwardly from said cylindrical flange, a wheel supported by said legs, a swivel ball bearing disposed beneath the perforated upper portion of said fork member, portions of said cylindrical flange being deformed inwardly to retain said swivel bearing in position, and means extending through the perforation in the upper portion of said fork member and engaging said bearing for mounting the caster on an article to be supported.

4. A caster comprising a ball swivel bearing having an annular outer race, and an inner race comprising two oppositely extending flanged members, a stem mounted on said inner race and securing said flanged members together, said stem extending upwardly from said inner race and having an enlarged portion having a lower surface engaging said inner race and an upper surface adapted to engage an article to be supported, and a fork member having wheel supporting legs and a hollow upper portion surrounding said ball swivel bearing with a perforated top surface overlying said bearing and through which said stem extends, said hollow upper portion having an inwardly deformed wall engaging said outer ball race and retaining said swivel bearing in position.

5. A caster comprising a ball swivel bearing having an annular outer race, and an inner race comprising two oppositely extending flanged members, a stem mounted on said inner race, said stem extending upwardly from said inner race and having an enlarged portion adapted to engage an article to be supported, and a fork member having wheel supporting legs and a hollow upper portion surrounding said ball swivel bearing with a perforated top surface overlying said bearing and through which said stem extends, said hollow upper portion having an inwardly deformed wall engaging said outer wall race and retaining said swivel bearing in position.

6. In a caster, a swivel bearing having an inner part and an outer part rotatable with respect thereto, a fork member having downwardly extending wheel supporting legs, a hollow upper portion surrounding said bearing and engaging and supporting the outer part thereof, and an upper wall overlying said bearing and having a central opening therethrough, and means mounted on the inner part of said bearing and extending upwardly through said central opening for attaching the caster to an article to be supported.

7. In a caster, a swivel ball bearing having an inner race, and an outer race rotatable with respect thereto, a fork member having downwardly extending wheel supporting legs, a hollow upper portion surrounding said bearing and engaging and supporting said outer race, and an upper wall overlying said bearing and having a central opening therethrough, and means mounted on the inner race of said bearing and extending upwardly through said central opening for attaching the caster to an article to be supported.

8. A caster comprising a fork member having a hollow upper portion, a downwardly extending flange and oppositely disposed legs extending downwardly from said flange, a wheel supported by said legs, and a ball bearing assembly comprising an inner ball race, an outer ball race, and bearing balls therebetween, said assembly being disposed within said hollow upper portion, and said flange having a portion engaging said outer ball race for retaining said bearing assembly in position.

WILFRED G. JOHNSON.